United States Patent [19]

Fanning

[11] 3,976,670

[45] Aug. 24, 1976

[54] CHEMICAL PROCESS FOR PRODUCING ESTERS FROM OLEFINS

[75] Inventor: Robert J. Fanning, Baton Rouge, La.

[73] Assignee: Ethyl Corporation, Richmond, Va.

[22] Filed: Dec. 9, 1974

[21] Appl. No.: 530,711

[52] U.S. Cl. .................. 260/410.9 R; 260/497 R
[51] Int. Cl.² .................. C11C 3/02; C07C 67/04
[58] Field of Search .............. 260/410.9 R, 497 C, 260/497 R

[56] References Cited
UNITED STATES PATENTS

| | | | |
|---|---|---|---|
| 2,868,813 | 1/1959 | Heislin | 260/410.9 R |
| 3,507,891 | 4/1970 | Hearne | 260/410.9 R |
| 3,641,074 | 2/1972 | Fenton | 260/410.9 R |
| 3,668,249 | 6/1972 | Fenton | 260/410.9 R |
| 3,845,121 | 10/1974 | Eubanks | 260/410.9 R |
| 3,856,832 | 12/1974 | Keblys | 260/410.9 R |

*Primary Examiner*—Winston A. Douglas
*Assistant Examiner*—John F. Niebling
*Attorney, Agent, or Firm*—Donald L. Johnson; John F. Sieberth; Shelton B. McAnelly

[57] ABSTRACT

A hydroesterification process is described for preparing esters of carboxylic acids by reacting an olefin, CO and an alcohol using a cobalt catalyst in the presence of a pyridine promoter. An important aspect of the present invention is improved catalyst effectiveness for a longer time brought about by the discovery of a process which reduces the deactivation rate of the catalyst.

21 Claims, 4 Drawing Figures

CHEMICAL PROCESS FOR PRODUCING ESTERS FROM OLEFINS

BACKGROUND OF THE INVENTION

The hydroesterification or hydrocarbomethoxylation of olefins catalyzed by cobalt catalysts is known, being described for example in U.S. Pat. No. 2,542,767. The use of a small amount of pyridine in combination with hydrogen is known to improve the selectivity of the hydroesterification of propylene. This is described by A. Matsuda and H. Uchida in Chem. Soc. Japan Bull. 38, 710–715 (1965). Relatively large amounts of pyridine alone are also known to promote propylene hydroesterification as disclosed by V. Gankin et al, in Zh. P. Kh. 40, 1862–1864 (1967).

Other discussions of the reaction of olefinic materials with CO in the presence of cobalt catalyst and a pyridine are contained in U.S. Pat. No. 3,507,891, in U.S.S.R. Pat. No. 173,754 (Sept. 25, 1965), and in Japanese Pat. No. 12,854 (July 21, 1966); in Chem. Abstracts, Vol. 68, 12411b (1968) (page 1169); by Ghankin et al, Zh. Prikl. Khim. (Leningrad) 14 (11) 2582–5, Nov. 1968; and by G. Natta, Brennstoff-Chem., 36, 176 (1955).

One of the seldom-mentioned problems of the prior art hydroesterification processes is catalyst inactivation. This problem is not readily appreciated in laboratory scale tests; however, it shows up in large scale operation. Until now, it has been necessary to replace the catalyst as its activity decreases. Since the provision of active catalyst on the scale necessary for commercial operations represents a significant factor in the cost of the product, it is desired to provide a way to reduce the rate of catalyst inactivation. The present invention provides a way to increase catalyst life by performing the process in a manner that is different from the usual prior art method of processing. In the past, it has been the customary practice to feed initially all of the olefin and lower alcohol required for the reaction including even a large excess of alcohol (100 percent excess or more) above the stoichiometric amount required for the reaction.

SUMMARY OF THE INVENTION

It has been discovered that, surprisingly, in the hydroesterification or hydrocarbomethoxylation of olefins catalyst inactivation is accelerated or its useful active life is shortened by the presence of the alcohol used for the reaction. The catalyst degradation rate is dependent upon alcohol concentration.

According to the present invention, catalyst inactivation is reduced by limiting the concentration of lower alcohol in contact with the catalyst. It has been discovered that the alcohol concentration is conveniently held to low levels by feeding the alcohol in a plurality of increments, i.e., at least two, feeding only a portion of the total alcohol initially leaving a portion of the alcohol for feeding later in the course of reaction after some of the initially fed alcohol is consumed in the reaction. Such incremental feeding of alcohol is readily accomplished in one or more of several ways such as an intermittent or continuous feed to a single batch reactor or by feeding the alcohol to two or more points in a plural reactor system or along the length of an elongated continuous or semi-continuous reactor whose length is many times its diameter so as to substantially avoid back-mixing. The number of increments is not critical since, even the use of two feed points or times provides improvement in catalyst life over the use of just one feed increment. On the other hand, there is no limit upon the number of alcohol feed points that can be used except that imposed by complexity and cost. Rarely, however, is it desirable to use more than about 10 feed points for the alcohol in long pipe type reactors where each additional feed point involves extra expense and complexity. In batch or in back-mixed continuous reaction systems, the effect of virtually an infinite number of increments can be obtained by a more or less continuous feed of alcohol.

With the use of a plurality of feed points in a long pipe reactor, the volume of material flowing through such a reactor increases along the length thereof. In many instances this is immaterial; however, in some instances as for good heat exchange, low pumping costs, etc. it is desirable to maintain the linear flow velocity through the reactor substantially constant. Where desired, this can be achieved with the plural feed of alcohol by increasing the reactor cross section at each feed point along the length thereof. Where the cross-section area is increased proportionately at each injection point, substantially uniform linear velocities can be obtained throughout the reactor. Since changes in reactor cross-section are generally complicated and costly, it usually is preferred to limit the number of increases in reactor cross-section to about five even where more than five alcohol feed points are used.

In many instances, a long pipe reactor preferably is obtained by arranging a plurality of pipes side by side in the form of a shell and tube heat exchanger with the headers compartmented to provide connections between selected tubes. By appropriate compartmentation, each successive tube pass readily is provided with a greater cross section area at a minimum of extra expense as by the use of more tubes or of larger diameter tubes. With feed of reactant alcohol into the header compartments, a plural feed together with uniform velocity in the tubes is obtained. With such a heat-exchanger arrangement, the shell of the heat exchanger provides a convenient enclosure for a heat exchanger fluid for the maintenance of desired reactor temperatures.

Accordingly, the present invention relates to an improvement in a process for the production of esters wherein a mono-olefinic hydrocarbon having from about 2 to about 20 carbon atoms is reacted with carbon monoxide and an alcohol having up to about 5 carbon atoms per molecule in the presence of a Group VIII transition metal carbonyl catalyst and a pyridine promoter. The improvement of the present invention consists essentially of performing the said reaction under conditions wherein only a part of the alcohol is supplied at the start of the reaction and additional alcohol is fed prior to the conclusion of the reaction.

DESCRIPTION OF THE PREFERRED EMBODIMENTS

In the process of the present invention, olefin, CO and alcohol are reacted at elevated temperature and pressure in the presence of a cobalt carbonyl catalyst and a pyridine to produce esters, whose acyl groups contain one more carbon atom than the starting olefin and whose (—R') group corresponds to the R group of the alcohol (ROH) reacted. Typically, therefore, the reaction of dodecene, CO and methanol produces methyl tridecanoate.

The present invention provides a way to extend catalyst life significantly. It has been discovered that the rate of deactivation of catalyst is affected by the concentration of the alcohol reactant, being more rapid when the alcohol is present in large amounts. Unfortunately, the alcohol is a necessary reactant which cannot be avoided entirely; however, it is possible to feed the alcohol in increments or continuously rather than all in just one charge at the start and thereby achieve the effect of having low alcohol concentration, thus extending the useful life of the catalyst.

Various arrangements are possible for the feed of alcohol in increments depending upon the configuration and operation method selected for the reactor. With a batch reactor arrangement, an incremental feed of alcohol is readily provided by a continuous feed of alcohol during at least part of the reaction period. In such a continuous feed of alcohol to the reactor, the effect can be that of virtually an infinite number of increments of alcohol feed.

In a preferred embodiment of the present invention, the alcohol is supplied in at least two increments, i.e., part at the start of the reaction, and part subsequently in at least one injection. Preferably the amount of alcohol fed at each increment is about the same. Alternately, the amount of alcohol fed at each increment is controlled so as to provide approximately a selected uniform alcohol concentration or a selected ratio of alcohol to unreacted olefin in the reaction mass following each feed.

Preferably the number of increments is from 2 to about 20, especially from about 3 to about 10, more especially from 4 to about 7.

In another preferred embodiment, the present invention is performed in a stirred pot batch type reactor system wherein substantially all of the olefin is fed initially and the alcohol is supplied substantially continuously or in at least two increments. Preferably where the alcohol is supplied substantially continuously, the feed thereof is for at least a substantial portion, i.e., at least about 10 percent of the total reaction time. Preferably the alcohol is fed substantially continuously for at least about 50 percent of the total reaction time, especially up to about 75 percent of the total reaction time.

Preferably the amount of unreacted alcohol in the reactor does not exceed about 50 percent of the stoichiometric amount for the reaction, based on the olefin present, especially it does not exceed about 25 percent, more especially it does not exceed about 10 percent, preferably it does not exceed about 5 percent. In general, the amount of unreacted alcohol in the reactor is enough to provide a significant reaction rate and therefore is from about 0.1 percent to about 50 percent of the stoichiometric amount required to react with the olefin present.

Olefins which are useful in the present hydroesterification process are unsaturated organic compounds having at least one non-aromatic carbon-to-carbon double bond. More preferred olefins are further characterized by having 4 or more carbon atoms. These olefins include compounds having other functional groups such as carboxy, carbonyl, halide, aryl groups and the like, provided that these functional groups do not adversely affect the reaction. Both branched as well as straight chain, acyclic and alicyclic olefins are included. Useful olefins are 4-nitrotridecene-1, oleic acid, 2-chloro-dodecene-1, 6-phenylundecene-1, ricinoleic acid, 3-hydroxy-heptadecene, and the like.

More preferred olefins are hydrocarbon monoolefins. These include alpha as well as internal olefins. Useful hydrocarbon monoolefins are hexene-2, butene-1, pentene-2, butene-2, tetracontene-4, triisobutylene, 2-methylbutene-1, 2-ethylhexene, pentadecene-3, heneicosene-1, octacosene-5, 4-butyldecene-1, hexadecene-2, 4,6,8,10,12-pentamethyltridecene1, 5,7,11-trimethyldodecene-1, cyclooctene, undecene-4, dotricontene-5, nonene-1, heptadecene-2 and the like. Although the $\alpha$-monoolefins ordinarily have a slightly higher reaction rate, the hydroesterification of both $\alpha$ and internal olefin is effectively promoted in the present process. This will be illustrated by the examples below. Mixtures of $\alpha$ and internal olefins are also useful.

Commercial mixtures of olefins can also be used in the present process. These commercial olefin mixtures are generally a mixture of various homologous olefins such as $C_4$, $C_6$, $C_8$ olefins; $C_8$, $C_{10}$, $C_{12}$, $C_{14}$, $C_{16}$ olefins; $C_4$, $C_5$, $C_6$, $C_7$ olefins; $C_5$, $C_7$, $C_9$ olefins; $C_{12}$, $C_{14}$ olefins; $C_{13}$, $C_{15}$, $C_{17}$ olefins; $C_{12}$, $C_{13}$, $C_{14}$, $C_{15}$, $C_{16}$ olefins; $C_{22}$, $C_{24}$, $C_{26}$ olefins; $C_{30}$, $C_{32}$, $C_{34}$, $C_{36}$ olefins; $C_{40}$ and higher olefin mixtures and the like. These commercial mixtures are synthesized for example by Ziegler catalyst polymerization of low molecular weight olefins such as ethylene or propylene; by dehydrogenation of suitable paraffins and the like. These commercial olefin mixtures can contain branched as well as straight-chain olefins; $\alpha$ olefins as well as internal olefins. The mixed olefins thus obtained might also contain minor amounts of non-homologous olefins as well as non-olefin components. Such non-olefin components might be paraffins, alkyl halides, alcohols and the like; the nature of the non-olefin components is to a great degree dependent on the synthesis route utilized. Commercial mixtures containing even carbon numbered olefins ranging from $C_4$–$C_{14}$ are useful. Such mixtures containing $C_4$–$C_8$ olefins; $C_4$, $C_6$ and $C_8$ olefins; $C_4$–$C_8$ olefins; $C_6$–$C_{10}$ olefins; or $C_{10}$, $C_{12}$ and $C_{14}$ olefins are particularly useful. The mixed olefins obtained from such a commercial synthesis can be used as such in the present process and need not be separated into the individual components to be useful. Mixtures containing $C_{12}$ to $C_{32}$ olefins wherein the α-moiety predominates are especially useful. By predominates I mean that more than 50 percent by weight of the olefins are alpha.

Preferably the olefin reacted has from about 10 to about 18 carbon atoms per molecule, especially from about 12 to about 16 carbon atoms per molecule. Preferred olefin is decene, dodecene, tetradecene, or hexadecene or mixtures of two or more thereof. A particularly preferred olefin is dodecene-1.

In general, unreacted olefins are recovered from the product and recycled to the reaction. Such recycled olefins are frequently high in internal olefins, even when starting α-olefins are used, due to isomerization. Usually this is of no consequence, like an initial feed of internal olefins, because of effective isomerization to α-olefinic structures of the olefinic molecules as they undergo the hydroesterification reaction.

The term "alcohol" is used herein in the sense of hydrocarbon derivatives in which one or more hydrogen atoms have been replaced by the "OH" group. The term "alkanol" is used in a more specific sense; i. e., where the hydrocarbon structure to which the OH is attached is an alkane hydrocarbon structure. Preferably the alcohols and alkanols have only one "OH" group per molecule.

For excellence of reaction, availability and properties of products, preferred alcohol reacted is alkanol. The alkanols preferably are normally liquid lower molecular weight alkanols. They include primary, secondary, and tertiary alkanols. Useful alkanols are 2-dodecanol, isopropanol, tert-butanol, 2-ethylhexanol, cyclohexanol, 2-methylpropanol, 2,2-dimethyl propanol, and the like. Monohydroxy alkanols having from 1 to 5 carbon atoms are preferred. Examples of preferred alkanols are the straight chain unsubstituted primary alkanols such as ethanol, n-pentanol, n-butanol and the like. Methanol is a most preferred alcohol.

A cobalt catalyst is utilized in the present process. Any cobalt containing compound capable of forming or existing as cobalt carbonyl under the reaction conditions can be used. Dicobalt octacarbonyl is a most preferred cobalt compound.

The catalyst concentration may be varied. Generally, amounts of catalyst sufficient to provide from 0.005 to 0.10 moles of cobalt per mole of olefin are used. A preferred cobalt:olefin mole ratio is about 0.05:1.

The present process uses a pyridine promoter. Suitable pyridine promoters include pyridine and substituted pyridines such as the halopyridines (e.g. 3-bromopyridine, 4-chloropyridine), the alkylpyridines (e.g. 4-tert-butylpyridine), quinolines, nitropyridines (e.g. 3-nitropyridine), cyanopyridines (e.g. 3-cyano-5-methylpyridine, 4-cyanopyridine), acylpyridines (e.g. 4-benzoylpyridine) and the like. Preferred pyridines are those which have no substituent in the alpha position. Preferred substituted pyridines have hydrocarbon only substitution. Examples of preferred substituted pyridines are $C_1-C_6$ alkylpyridines (β-picoline, 3-hexylpyridine, 3,5-diethyl pyridine, 4-cyclohexylpyridine, and the like, and acylpyridines (3-butyrylpyridine, 4-propionylpyridine, 4-acetyl-3methylpyridine), and the like. Pyridine is a most preferred promoter.

The amount of pyridine promoter used can be varied. Ordinarily quantities of a pyridine sufficient to provide a pyridine promoter:olefin ratio of less than 3:1 may be used. Excess amounts of pyridine are to be avoided since they tend to reduce the reaction rate and have no further improving effect on ester linearity. A lower pyridine promoter limit is that amount which will effect the desired level of rate and linearity improvement. Promoter:olefin molar ratios as low as 0.6:1 can be used.

The pyridine promoters increase the reaction rate and improve the linearity of the product ester. The improvement in rate is generally indicated by an increase in the product yield. Regarding linearity improvement, it is recognized that when, for example, an α-linear olefin is hydroesterified, two types of products are obtained—linear ester (CO adds to terminal carbon atom) and branched ester. The reaction equation for hydroesterifying octene-1 is presented below for illustration of exemplification purposes.

Thus, the product obtained is a mixture of branched and linear esters. For α-olefins in the absence of any promoter, the product contains about 50–60 percent linear ester. The pyridine promoters increase the linearity of the ester product substantially above this range.

The present reaction is carried out at temperatures of 100° to 225°C. A preferred temperature range is 125° to 200°C; a most preferred range is about 150° to about 175°C.

Reaction pressures utilized range from about 50 atmospheres to about 300 atmospheres. Pressures outside this range tend to have an adverse effect on the reaction rate. Since one of the reactants, carbon monoxide, is a gas under reaction conditions, the pressure of the reaction system is substantially that due to the carbon monoxide reactant.

A preferred embodiment of the present invention is a process for preparing esters of carboxylic acids by reacting olefin having from about 10 to about 18 carbon atoms per molecule, carbon monoxide and a $C_1-C_5$ alkanol using a cobalt catalyst in the presence of a pyridine promoter such that the molar ratio of pyridine:olefin is from about 0.6:1 to about 3:1 and the molar ratio of cobalt to olefin is from about 0.005 to about 0.10, at a temperature from about 100° to about 225°C and a pressure from about 50 to about 300 atmospheres.

Preferably the reaction is conducted as a continuous process using a tubular reactor wherein the diameter of the tubes is small in proportion to reactor length to minimize back mixing.

Figure 1:
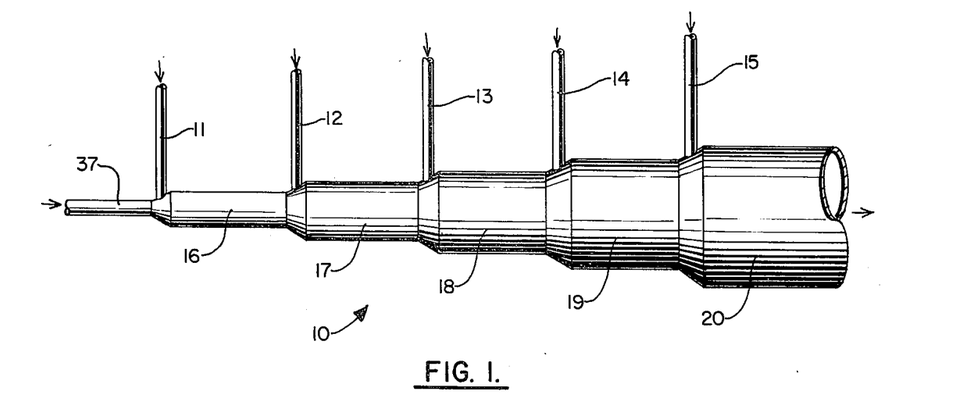
FIG. 1 shows a long tubular reactor constructed with a plurality of feed points suitable for practicing the present invention.

The long, continuous feed reactor 10 of FIG. 1 to which attention is now directed is a preferred reactor configuration in many instances. An incremental feed of alcohol for such a long pipe reactor is obtainable by feeding the alcohol at a plurality, i.e., at least two, points 11, 12, 13, 14, 15 along the length of the reactor. When such a feed arrangement is used, at least part of the alcohol fed at one point reacts before the mass reaches the next alcohol feed point so that the amount of alcohol present in the mass at said next point is less than the total alcohol fed.

Since the hydroesterification reaction is exothermic, cooling of the reactor is required. With a batch or pot type reactor, such cooling is readily provided by external jacketing or internal coils, or a pump-around heat exchanger loop or a combination of such. With the long pipe reactor, external jacketing is usually preferred and flow rates are preferably chosen to provide suitable velocities to achieve good heat transfer coefficients without excessive pumping costs. Maintaining such velocities in a pipe reactor with the plural feed points and a reactor pipe of uniform cross-section area can provide problems, thus in general it is preferred to increase the reactor cross-section area after each feed point so as to maintain substantially uniform flow rates throughout the reactor. Provision for size transitions as well as for numerous different sizes of pipes 16, 17, 18, 19, 20 introduces extra costs, particularly where many feed points are used. Thus in general, the long pipe reactor is usually limited to a maximum of about five different sizes of pipe even though more feed points may be used.

For simplicity, the lengths of the pipes 16, 17, 18, 19 and 20 as shown in FIG. 1 have been reduced relative to the diameters. In actual long pipe reactors, the lengths of the pipes 16–20 are many times the diameters so that back-mixing within the reactor is substantially avoided.

Figure 2:
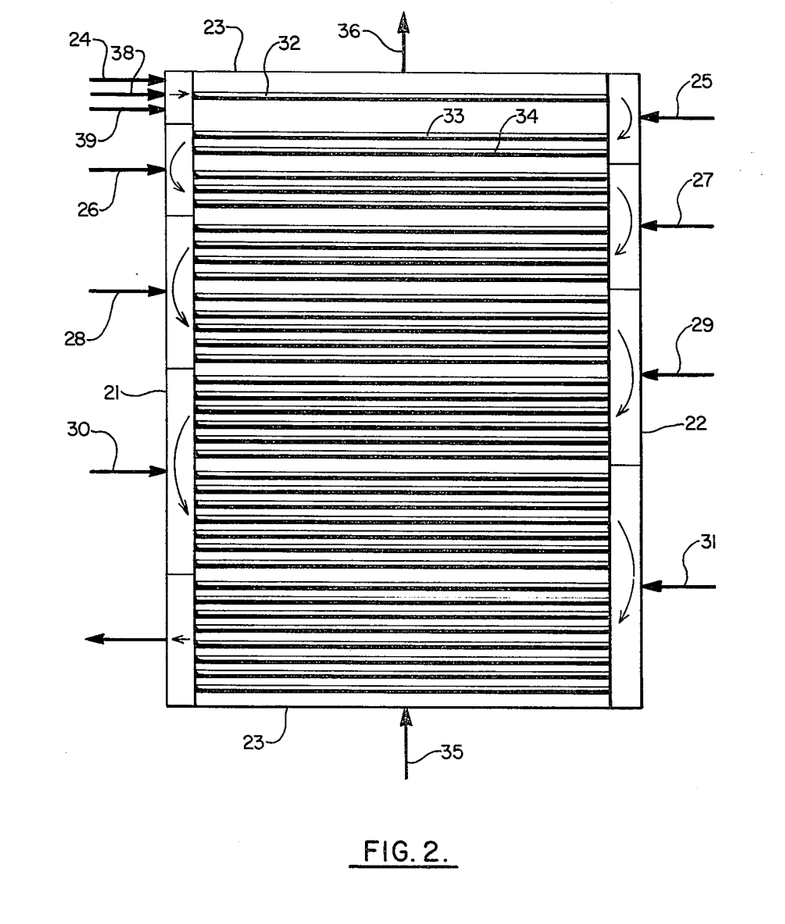
FIG. 2 shows a shell and tube heat exchanger type of reactor suitable for the practice of the present invention.

Another reactor arrangement that is advantageous especially where many feed points are desired is the shell and tube heat exchanger as shown more or less schematically in FIG. 2. In this reactor, the tubes are connected to headers 21 and 22 and the space between the headers is enclosed by a cylindrical shell 23. In this arrangement, the pipes or tubes are of uniform diameter throughout, various different numbers of tubes being connected in parallel by interconnections in the headers to achieve the desired velocity relationship. In general, the tubes are arranged in groups or "passes" having different numbers of tubes with an alcohol feed point being provided for each group. Thus, for example, where alcohol is fed at each of 8 feed points 24–31, 8 groups or passes of tubes are preferably used, the first pass having one tube 32; the second, two tubes 33 and 34; the third, three tubes etc.

Control of the temperature of the reactor of FIG. 2 is provided by any suitable means such as by circulating a heat exchange fluid within the shell through inlet 35 and outlet 36 or by adjusting the pressure within the shell to secure boiling therein of a liquid, such as hexane. The latter is particularly convenient for maintaining temperature uniformity throughout the reactor at typical temperatures such as 302°F.

The other feeds for the reactors of FIGS. 1 and 2 include olefin, CO, cobalt carbonyl catalyst and the pyridine promoter. In general, all of the olefin, as well as all of the catalyst and all of the promoter, is fed to the reactors at the inlet ends, e.g. through pipes 37 and 38 for the reactors of FIGS. 1 and 2, respectively. Likewise, it is usually preferred to feed the entire amount of C0 required for the reaction to the reactors at the inlet ends through pipes 37 and 39, for the reactors of FIGS. 1 and 2, respectively, Alternately, part of the required CO is suitably supplied through one or more of the alcohol feed lines 11–15 of FIG. 1 or 24–31 of FIG. 2 or otherwise preferably at or near the transition portions. Although the proportioning and control of the feed of CO through one or more of the alcohol feed lines 11–15 or 24–31, as well as the inlet 37 or 39, involves extra complexity, in some instances it is desirable for purposes of reducing the gas or vapor load in the initial portions of the reactors.

Sufficient alkanol is ordinarily used to provide at least one mole of alkanol overall per mole of olefin. Although large excesses of alcohol provide higher catalyst inactivation rates, the plural feed principles of the present invention are still usable to advantage when large excesses are used. Thus, overall alkanol:olefin molar ratios of 1:1 to 9:1 are useful. Preferred overall molar ratios of alkanol:olefin are 1.01:1 to about 3:1, especially from 1.01:1 to about 1.1:1 where an excess of alcohol is desired. In general, any reduction in the concentration of alcohol in the reaction system leads to a lengthening of catalyst life. Thus feeding the alcohol in even two increments provides a substantial improvement in catalyst life over feeding all at once whatever alcohol is used. When three or more increments are used or when the alcohol feed is sufficiently prolonged in a batchwise system, the maximum concentration of alcohol in the system readily can be about or less than 100 percent of the stoichiometric amount of alcohol required to complete the reaction of the olefin present at that point. Although the present invention does not exclude the feed of more than the stoichiometric amount of alcohol total or overall, the principles do suggest that it is desirable to hold the overall excess above the stoichiometric amount to a small amount, say 50 percent or less, preferably 10 percent or less, more preferably 5 percent or less, even 1 percent or less.

The following examples indicate preferred embodiments and aspects of the present invention.

EXAMPLE I

To a 5-gallon agitated autoclave was added 6900 milliliters (ml) of cobalt catalyst solution. The solution contained about 8 percent by weight of cobalt as the carbonyl in pyridine (pyridine.HCo(CO)$_4$).

Methanol was added to the autoclave to provide a solution in the autoclave containing 6 percent methanol by weight.

The autoclave was then flushed twice with CO to displace any residual N$_2$ or air, pressured to 1000 psig with CO and then heated to 150°C, the pressure rising to 1200–1400 psig. Additional CO was then fed to raise the pressure to 2000 psig (at 150°C). Samples (300 ml each) were then taken from the reaction mixture at that time and at various other times from 2 to 65 hours thereafter to provide samples of catalyst that had been subjected to contact with 6 percent methanol for various controlled duration periods of time.

The foregoing procedure was repeated for 0, 3, 10.7, 23.5, 24 and 34.8 percent methanol solutions to provide samples of catalyst which had experienced prior contact with alcohol in various concentrations for a variety of contact times as well as catalyst which had not been exposed to alcohol.

The activity of the various catalyst solutions was determined according to the following procedure.

A heated, agitated, 1-liter autoclave equipped with a catalyst charging injection cylinder and CO feed system was provided. To the autoclave was added 344 grams of dodecenes (about 90 percent dodecene-1, balance internal and/or branched isomers), 131 grams of methanol and 52 grams of pyridine. The 131 grams of methanol represents 200 percent of stoichiometric or 100 percent excess over that required for complete reaction of the olefin.

The injection cylinder was charged with about 70 grams of catalyst solution to be tested for activity (60–75 grams range in various experiments) which had been prepared as outlined in the initial portion of this example. CO was then fed to the injection cylinder to raise the pressure therein to 650 psig. At this point, the injection cylinder was connected to the autoclave but communication therebetween was blocked by cut-off valves.

The autoclave was then purged with CO, pressured to 250–300 psig with CO, and heated to 140°C, the pressure increasing to about 350 psig during the heating.

The valves in the line between the autoclave and the injection cylinder were then opened to allow the liquid contents of the injection cylinder to discharge into the autoclave, marking the start of timing of a catalyst activity test run. The temperature quickly rose to 150°C and was thereafter automatically controlled at this point. As rapidly as possible, the autoclave was pressured to 2000 psig with CO. The CO supply was then cut off. The pressure in the autoclave dropped as the reaction progressed. When the pressure had dropped to 1850 psig, the autoclave was repressured to 2000 psig. The step-wise pressurization of the autoclave with CO was continued throughout the run.

After 30 minutes of reaction, a 20 ml sample of the reacting mass was withdrawn and immediately analyzed by VPC for olefin content. From this data, the percent conversion of the olefin was calculated.

Figure 3:
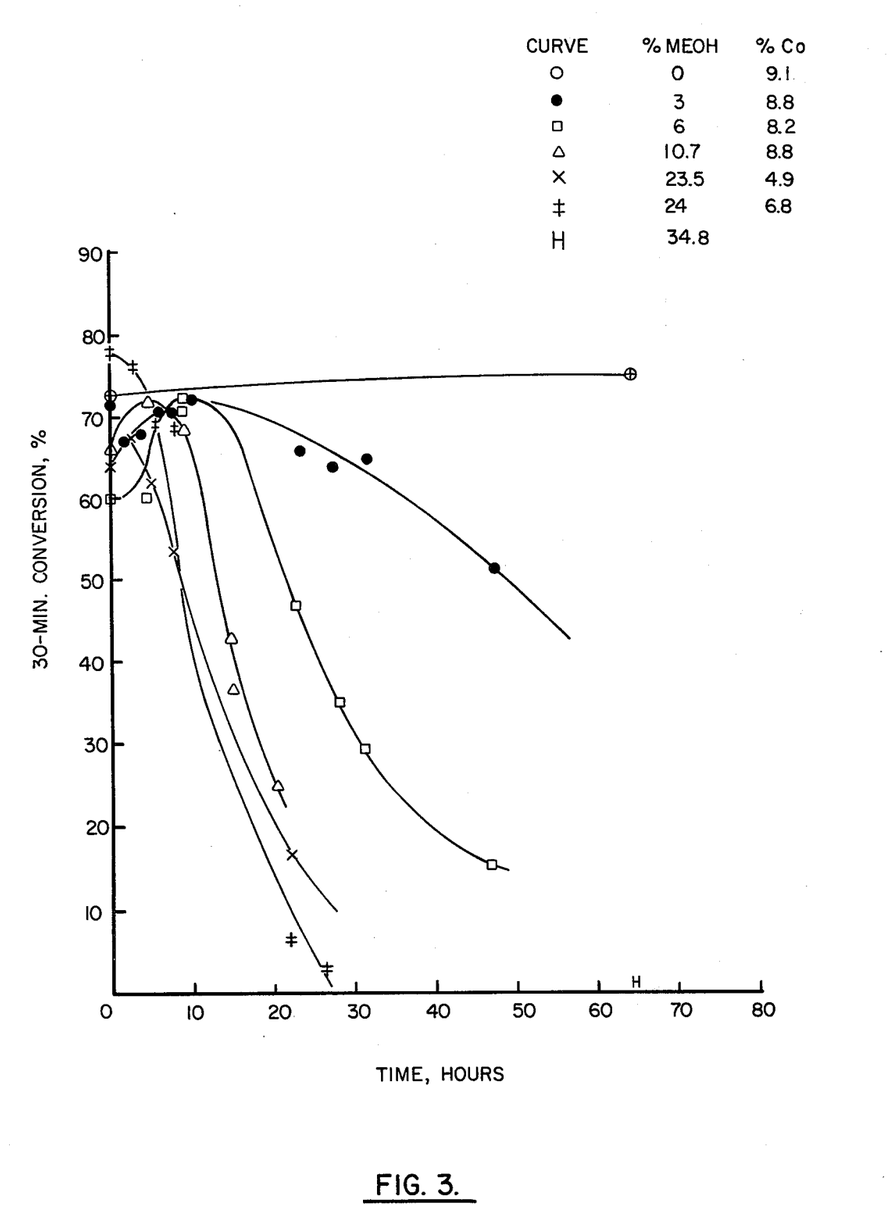
FIG. 3 shows a series of reaction rate curves to indicate the decrease in catalyst activity with time for various concentrations of alcohol.

Data thus obtained are tabulated in Table I and are plotted in FIG. 3. The tabulation indicates data for runs with catalyst solution that had been exposed to methanol in concentrations of 0, 3, 6, 10.7, 12.4, 23.5, 24 and 34.8 percent by weight for various periods of time from zero to 65 hours as indicated. The various catalyst solutions had cobalt concentrations as indicated. It is evident from inspection of FIG. 3 that the catalyst activity was lower with the catalyst samples that had experienced the more severe contact with methanol.

TABLE I

| MeOH Percent | Cumulative Time Hrs. | Cobalt Conc. Percent | Conversion (30 min.) Percent |
|---|---|---|---|
| 0.0 | 0.0 | 9.1 | 72.4 |
| 0.0 | 64.5 | 9.1 | 74.7 |
| 3.0 | 0.0 | 8.8 | 71.0 |
| 3.0 | 2.0 | 8.8 | 67.0 |
| 3.0 | 3.9 | 8.8 | 68.0 |
| 3.0 | 5.8 | 8.8 | 71.2 |
| 3.0 | 7.8 | 8.8 | 70.5 |

TABLE I-continued

| MeOH Percent | Cumulative Time Hrs. | Cobalt Conc. Percent | Conversion (30 min.) Percent |
|---|---|---|---|
| 3.0 | 9.7 | 8.8 | 72.0 |
| 3.0 | 23.5 | 8.8 | 65.4 |
| 3.0 | 27.5 | 8.8 | 63.5 |
| 3.0 | 31.5 | 8.8 | 64.1 |
| 3.0 | 47.5 | 8.8 | 50.9 |
| 6.0 | 0.0 | 8.2 | 60.2 |
| 6.0 | 4.5 | 8.2 | 60.1 |
| 6.0 | 9.0 | 8.2 | 70.8 |
| 6.0 | 23.0 | 8.2 | 46.8 |
| 6.0 | 28.0 | 8.2 | 34.9 |
| 6.0 | 31.0 | 8.2 | 29.2 |
| 6.0 | 41.0 | 8.2 | 14.8 |
| 6.6 | 16.2 | 1.2 | 61.0 |
| 10.7 | 0.0 | 8.8 | 66.1 |
| 10.7 | 4.6 | 8.8 | 71.8 |
| 10.7 | 9.2 | 8.8 | 66.3 |
| 10.7 | 9.2 | 8.8 | 66.9 |
| 10.7 | 15.0 | 8.8 | 62.9 |
| 10.7 | 15.0 | 8.8 | 36.9 |
| 10.7 | 20.6 | 8.8 | 24.2 |
| 12.4 | 16.5 | 1.1 | 55.0 |
| 12.4 | 16.0 | 1.1 | 51.5 |
| 23.5 | 0.0 | 4.9 | 63.9 |
| 23.5 | 2.5 | 4.9 | 67.4 |
| 23.5 | 5.0 | 4.9 | 61.9 |
| 23.5 | 7.9 | 4.9 | 57.4 |
| 23.5 | 22.0 | 4.9 | 16.1 |
| 24.0 | 0.0 | 6.8 | 78.5 |
| 24.0 | 2.7 | 6.8 | 76.2 |
| 24.0 | 5.5 | 6.8 | 69.6 |
| 24.0 | 8.2 | 6.8 | 69.4 |
| 24.0 | 22.2 | 6.8 | 6.2 |
| 24.0 | 26.5 | 6.8 | 2.6 |
| 34.8 | 65 | ~5.5 | 0.2 |

EXAMPLE II

The following example of the present invention uses a batch-wise process wherein half of the stoichiometric amount of alcohol is fed initially and the balance of the alcohol fed after a major portion (about 80 percent) of the alcohol fed initially had reacted. The 1-liter autoclave used in Example I was charged with 344 grams dodecenes as in Example I, 35 grams methanol (53 percent of stoichiometric), 57 grams pyridine, and 63 grams of a catalyst solution containing about 9.1 percent by weight of cobalt as the carbonyl in pyridine and which had not been exposed to alcohol previously.

The injection cylinder was charged with another 35 grams of methanol which represents 53 percent of the required stoichiometric amount (65.6 grams total) for the reaction. The autoclave was pressured with CO, heated to 150°C and pressurized to 2000 psig. Samples were taken after 5 and 15 minutes of reaction and were analyzed for olefin content for purposes of determining the extent of conversion at those times.

At 15 minutes reaction time, olefin conversion was about 44 percent, indicating that about 83 percent of the methanol fed initially had reacted. At 20 minutes, the injection cylinder was discharged into the autoclave providing a second feeding of methanol also in the amount of 53 percent of the stoichiometric amount required for complete reaction of the olefin fed. In this run, the maximum amount of alcohol in contact with the catalyst was about 63 percent of the total alcohol required for the overall reaction. This represents considerably less alcohol than that commonplace in prior art which supplies initially several times the stoichiometric amount of alcohol required for the reaction.

Additional samples of the reaction mixture were taken for analysis at the 25, 34, 45, 60 and 90 minute time points as measured from the start of the reaction.

Figure 4:
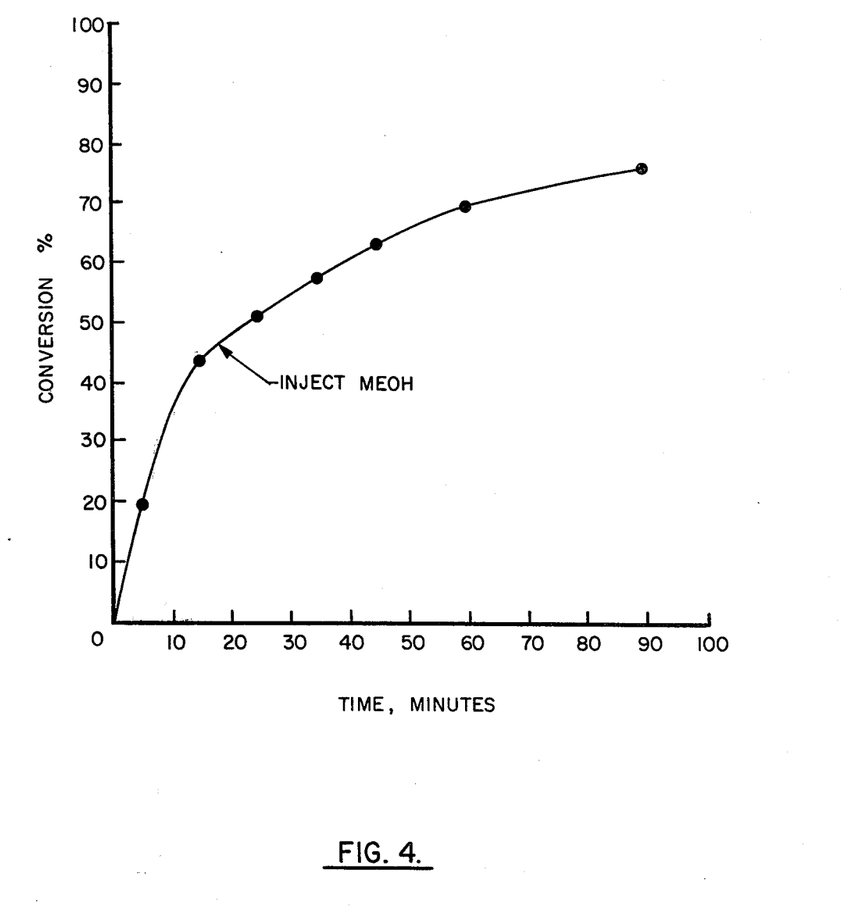
FIG. 4 shows a reaction rate curve for a plural increment reaction.

The samples were analyzed for olefin content. From the olefin content information, the conversions at the various sampling times were calculated. The results are given in Table II with the information thus obtained being plotted in FIG. IV of the drawing. This example shows a preferred embodiment of the process of the invention.

Table II

| Time (Minutes) | Olefin Conversion Percent |
|---|---|
| 5 | 29.5 |
| 15 | 43.5 |
| 25 | 50.4 |
| 35 | 57.2 |
| 45 | 62.8 |
| 60 | 68.7 |
| 90 | 75.5 |

EXAMPLE III

A one-liter stirred, high pressure autoclave was fitted with an auxiliary high pressure cylinder to enable the addition of catalyst solution after reaching temperature. It was also fitted to allow sampling, while at 150°C and 2000 psi pressure. The autoclave was charged with 344 g dodecenes as in Example I, 131 g methanol (200 percent of stochiometric) and 52 g pyridine. The catalyst cylinder was charged with 70 g catalyst solution containing about 8 percent cobalt as the carbonyl in pyridine. The autoclave was purged with 200 psi carbon monoxide and then pressured with 300 psi CO before heating to 140°C. At this time the catalyst was charged from the auxiliary cylinder and the pressure raised to 2000 psig with carbon monoxide. Temperature was automatically maintained at 150°C and CO was added manually to maintain 2000 psi for a 90 minute run. Samples were taken every 10 minutes up to 90 minutes total reaction time. The samples were analyzed by VPC to determine the amount of olefin remaining from which the percent conversion of the olefin was calculated.

A second experiment, using the above technique, was made using 344 g of olefin, 65.5 g methanol (100 percent of stoichiometric), 52 g pyridine and 70 g catalyst solution. Samples were taken at 10, 20, 30, 45, 60 and 90 minutes and analyzed for determining the percent conversion of the olefin.

In the same manner, an experiment was made using 344 grams of olefin, 32.7 g methanol (50 percent of stoichiometric), 52 g pyridine, and 70 g catalyst. Samples were taken at 10, 20, 30, 45, 60 and 90 minutes and analyzed as before. Finally, an experiment was made using 344 g C$_{12}$ olefins, 16.4 g methanol (25 percent of stoichiometric), 52 g pyridine and 70 g catalyst solution. Samples were taken at 10 and 20 minutes and analyzed as before.

Thus, four sets of data were obtained to determine the effect on the hydroesterification reaction of using 200, 100, 50 and 25 percent of the theoretical amount of methanol necessary to convert dodecene to methyl esters. The results are tabulated in Table III.

TABLE III

| Time Minutes | Conversion Percent of Stoichiometric Amount of Alcohol Fed | | | |
|---|---|---|---|---|
| | 200 | 100 | 50 | 25 |
| 10 | 46.5 | 39 | 28 | 22 |
| 20 | 68 | 63 | 43.5 | 26 |
| 30 | 76.5 | 71 | 48.5 | — |
| 40 | 80 | — | — | — |
| 45 | — | 76 | 50.5 | — |
| 50 | 82.5 | — | — | — |
| 60 | 84.5 | 79.5 | 51 | — |
| 70 | 86.5 | — | — | — |
| 80 | 88 | — | — | — |
| 90 | 89.5 | 82 | 51 | — |

From these data, relative rate constants for various alcohol concentrations can be determined.

I claim:

1. In a process for the production of esters wherein a mono-olefinic hydrocarbon having from about two to about twenty carbon atoms is reacted with carbon monoxide and an alcohol having up to about 5 carbon atoms per molecule in the presence of a Group VIII transition metal carbonyl catalyst and a pyridine promoter, the improvement consisting essentially of performing said reaction under conditions wherein substantially all of the olefin is supplied at the start of the reaction and from about 0.1 to 50 percent of the total alcohol is fed at one of: (a) the start of the reaction, or (b) after the start of the reaction and prior to the conclusion of the reaction, and the balance of the alcohol is supplied at the other of (a) and (b).

2. A process according to claim 1 wherein the alcohol is supplied in at least two increments.

3. A process according to claim 2 wherein the amount of alcohol fed at each increment is about the same.

4. A process according to claim 2 wherein the number of increments is from 2 to about 20.

5. A process according to claim 2 wherein the number of increments is from about 3 to about 10.

6. A process according to claim 2 wherein the number of increments is from about 4 to about 7.

7. A process according to claim 1 wherein substantially all of the olefin is fed initially to a stirred pot reactor and the alcohol is supplied substantially continuously for at least a substantial portion of the total reaction time or in at least the two increments (a) and (b) as defined in claim 1.

8. A process according to claim 7 wherein the substantial portion is at least about 10 percent of the total reaction time.

9. A process according to claim 7 wherein the substantial portion is at least about 50 percent of the total reaction time.

10. A process according to claim 7 wherein the substantial portion is at least about 75 percent of the total reaction time.

11. A process according to claim 1 wherein the reaction is conducted in an elongated tubular reactor wherein the diameter of the tubes is small in proportion to their length to minimize back mixing, substantially all of the olefin and the (a) part of the alcohol being fed initially at a point at one end of the reactor, the (b) part of the alcohol being fed at one or more points along the length of the reactor.

12. A process according to claim 1 wherein the amount of unreacted alcohol in the reactor does not exceed about 25 percent of the stoichiometric amount for the reaction based on the olefin present.

13. A process according to claim 1 wherein the amount of unreacted alcohol in the reactor does not exceed about 10 percent of the stoichiometric amount for the reaction based on the olefin present.

14. A process according to claim 1 wherein the amount of unreacted alcohol in the reactor does not exceed about 5 percent of the stoichiometric amount for the reaction based on the olefin present.

15. A process according to claim 1 wherein the amount of unreacted alcohol in the reactor is from about 0.1 to about 50 percent of the stoichiometric amount required to react with the olefin present.

16. A process according to claim 1 wherein the olefin has from about 10 to about 18 carbon atoms.

17. A process according to claim 1 wherein the olefin has from about 12 to about 16 carbon atoms.

18. A process according to claim 1 wherein the olefin is dodecene-1.

19. A process according to claim 1 wherein the pyridine is pyridine.

20. A process according to claim 1 wherein the alcohol is alkanol.

21. A process according to claim 1 wherein the alcohol is methanol.

* * * * *